(12) United States Patent
Mochizuki et al.

(10) Patent No.: US 12,463,225 B2
(45) Date of Patent: Nov. 4, 2025

(54) METHOD FOR PRODUCING CATALYST INK

(71) Applicant: TOYOTA JIDOSHA KABUSHIKI KAISHA, Toyota (JP)

(72) Inventors: Shuto Mochizuki, Toyota (JP); Kazuhiro Hirabayashi, Toyota (JP); Junji Nakanishi, Kasugai (JP); Makoto Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 18/530,548

(22) Filed: Dec. 6, 2023

(65) Prior Publication Data

US 2024/0194897 A1 Jun. 13, 2024

(30) Foreign Application Priority Data

Dec. 13, 2022 (JP) ................. 2022-198393

(51) Int. Cl.
*H01M 4/86* (2006.01)
*H01M 4/88* (2006.01)
*H01M 4/92* (2006.01)
H01M 4/04 (2006.01)
H01M 8/10 (2016.01)

(52) U.S. Cl.
CPC ....... *H01M 4/8663* (2013.01); *H01M 4/8828* (2013.01); *H01M 4/926* (2013.01); H01M 4/04 (2013.01); H01M 2008/1095 (2013.01)

(58) Field of Classification Search
CPC .... H01M 4/04; H01M 4/8663; H01M 4/8828; H01M 4/926; H01M 2008/1095

USPC .................................................. 427/113, 115
See application file for complete search history.

(56) References Cited

U.S. PATENT DOCUMENTS

| | | | | |
|---|---|---|---|---|
| 9,172,107 | B2* | 10/2015 | Wang | H01M 8/1039 |
| 11,569,521 | B2 | 1/2023 | Endo et al. | |
| 2008/0160413 | A1* | 7/2008 | Dopp | H01M 4/8605 |
| | | | | 429/246 |
| 2010/0291462 | A1* | 11/2010 | Thate | H01M 8/1004 |
| | | | | 429/535 |
| 2018/0108903 | A1* | 4/2018 | Takeda | H01M 4/0404 |
| 2021/0184225 | A1* | 6/2021 | Yamanishi | F26B 13/10 |

(Continued)

FOREIGN PATENT DOCUMENTS

| | | |
|---|---|---|
| JP | 2018089961 A | 6/2018 |
| JP | 6911748 B2 | 7/2021 |
| JP | 7088117 B2 | 6/2022 |

*Primary Examiner* — Brian K Talbot
(74) *Attorney, Agent, or Firm* — Dickinson Wright, PLLC

(57) ABSTRACT

A method for producing a catalyst ink for fuel cells, wherein the method comprises obtaining the catalyst ink; wherein the catalyst ink comprises a catalyst, a carbon support, an ionomer, a solvent and a cation additive; wherein the catalyst is supported on the carbon support; wherein the carbon support is carbon support particles; wherein a particle size D90 of the carbon support particles in the catalyst ink is less than 3 μm; wherein, when a catalyst layer is formed by applying the catalyst ink to a substrate, a peel strength of the catalyst layer from the substrate is less than 3 N/m; and wherein a weight per unit area of the cation additive in the catalyst ink applied to the substrate, is 2.1 μg/cm² or more and 3.3 μg/cm² or less.

2 Claims, 2 Drawing Sheets

(56) References Cited

U.S. PATENT DOCUMENTS

| | | | |
|---|---|---|---|
| 2023/0131420 A1* | 4/2023 | Noda | C08J 3/22 524/575.5 |
| 2024/0025764 A1* | 1/2024 | Ikeda | C01G 55/004 |

* cited by examiner

When the amount of cation is small

Catalyst layer transfer residue

Coated sheet  Many transfer residues

When the amount of cation is large

A carbon aggregate in the catalyst layer

Generation of carbon aggregates due to poor dispersion
Poor catalyst layer quality

METHOD FOR PRODUCING CATALYST INK

TECHNICAL FIELD

The disclosure relates to a method for producing a catalyst ink for fuel cells.

BACKGROUND

Various studies have been made on fuel cells (FC). Patent Literature 1 discloses a transfer sheet for transferring layers.

Patent Literature 1: Japanese Patent Application Laid-Open (JP-A) No. 2018-089961

The transfer performance of a catalyst layer depends on the type and amount of an ionomer added to a catalyst ink. In the related art, accordingly, the quality of the catalyst layer may be deteriorated due to poor dispersion of the catalyst ink.

SUMMARY

The present disclosure was achieved in light of the above circumstances. An object of the present disclosure is to provide a method for producing a catalyst ink for fuel cells, which is configured to suppress a deterioration in the quality of a catalyst layer.

The method for producing the catalyst ink for fuel cells according to the present disclosure is a method for producing a catalyst ink for fuel cells,
  wherein the method comprises obtaining the catalyst ink;
  wherein the catalyst ink comprises a catalyst, a carbon support, an ionomer, a solvent and a cation additive;
  wherein the catalyst is supported on the carbon support;
  wherein the carbon support is carbon support particles;
  wherein a particle size D90 of the carbon support particles in the catalyst ink is less than 3 μm;
  wherein, when a catalyst layer is formed by applying the catalyst ink to a substrate, a peel strength of the catalyst layer from the substrate is less than 3 N/m; and
  wherein a weight per unit area of the cation additive in the catalyst ink applied to the substrate, is 2.1 μg/cm$^2$ or more and 3.3 μg/cm$^2$ or less.

In the method of the present disclosure, the catalyst ink may be obtained by dispersing a raw material mixture containing the catalyst, the carbon support, the ionomer, the solvent and the cation additive.

The method for producing the catalyst layer for fuel cells according to the present disclosure is a method for producing a catalyst layer for fuel cells,
  wherein the method comprises forming the catalyst layer by applying the catalyst ink to a substrate.

The present disclosure can provide the method for producing the catalyst ink for fuel cells, which is configured to suppress a deterioration in the quality of the catalyst layer.

BRIEF DESCRIPTION OF THE DRAWINGS

In the accompanying drawings.

DETAILED DESCRIPTION

Hereinafter, the embodiments of the present disclosure will be described in detail. Matters that are required to implement the present disclosure (such as common catalyst ink for fuel cells structures and production processes not characterizing the present disclosure) other than those specifically referred to in the Specification, may be understood as design matters for a person skilled in the art based on conventional techniques in the art. The present disclosure can be implemented based on the contents disclosed in the Specification and common technical knowledge in the art.

In the Specification, "-" used to indicate a numerical range, is used to mean that the range includes the numerical values described before and after "-" as the lower and the upper limit values.

Also in the Specification, the upper and lower limit values of the numerical range may be a desired combination.

The method for producing the catalyst ink for fuel cells according to the present disclosure is a method for producing a catalyst ink for fuel cells,
  wherein the method comprises obtaining the catalyst ink;
  wherein the catalyst ink comprises a catalyst, a carbon support, an ionomer, a solvent and a cation additive;
  wherein the catalyst is supported on the carbon support;
  wherein the carbon support is carbon support particles;
  wherein a particle size D90 of the carbon support particles in the catalyst ink is less than 3 μm;
  wherein, when a catalyst layer is formed by applying the catalyst ink to a substrate, a peel strength of the catalyst layer from the substrate is less than 3 N/m; and
  wherein a weight per unit area of the cation additive in the catalyst ink applied to the substrate, is 2.1 μg/cm$^2$ or more and 3.3 μg/cm$^2$ or less.

In the prior art, the addition amount of the cation additive to the catalyst ink, which achieves both of the dispersibility of the carbon carrier in the catalyst ink during the preparation of the catalyst ink and the transferability of the catalyst layer formed after coating from the base material to the electrolyte membrane, is unknown.

In the present disclosure, in a catalyst ink for a fuel cell, an amount of the cation additive added to a catalyst ink that achieves both dispersibility of a carbon carrier in a catalyst ink during preparation of a catalyst ink and transferability of a catalyst layer formed after coating from a base material to an electrolyte membrane is defined.

According to the present disclosure, it is possible to suppress the deterioration of the quality of the catalyst layer due to the filtration clogging of the raw material and the generation of the aggregate (carbon aggregate) of the carbon carrier due to the poor dispersion of the catalyst ink.

According to the present disclosure, it is possible to suppress a transfer failure of the catalyst layer to the electrolyte membrane and a transfer remaining of the catalyst layer of the base material.

Figure 1:
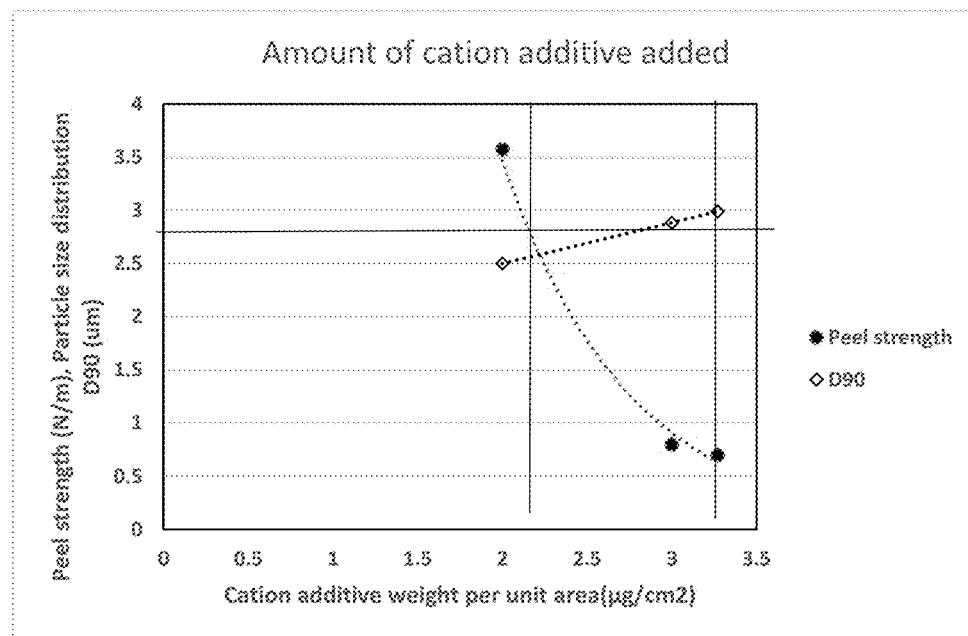
FIG. 1 is a graph showing an exemplary relation between the weight per unit area of the cation additive (the amount of the added cation additive), the peel strength between the catalyst layer and a substrate, and the particle size D90 of the carbon support particles.

FIG. 1 is a graph showing an exemplary relation between the weight per unit area of the cation additive (the amount of the added cation additive), the peel strength between the catalyst layer and a substrate, and the particle size D90 of the carbon support particles.

As shown in FIG. 1, the smaller the amount of the cation additive added, the greater the peel strength between the catalyst layer and the substrate. The lower the amount of cation additive added, the more free ionomers in the catalyst layer. Since the free ionomer contributes to adhesion to the base material, the peel strength between the catalyst layer and the base material is increased, and more force for peeling the catalyst layer from the base material is required.

Table 1 shows the weight per unit area of the cation additive of Samples 1 to 3 shown in FIG. 1, the peel strength between the catalytic layer and the substrate, and the particle size D90 of the carbon support.

TABLE 1

|  | Cation additive weight per unit area μg/cm$^2$ | Peel strength N/m | D90 μm |
| --- | --- | --- | --- |
| Sample 1 | 2 | 3.57 | 2.5 |
| Sample 2 | 3 | 0.8 | 2.8831 |
| Sample 3 | 3.27 | 0.7 | 2.9913 |

Figure 2:
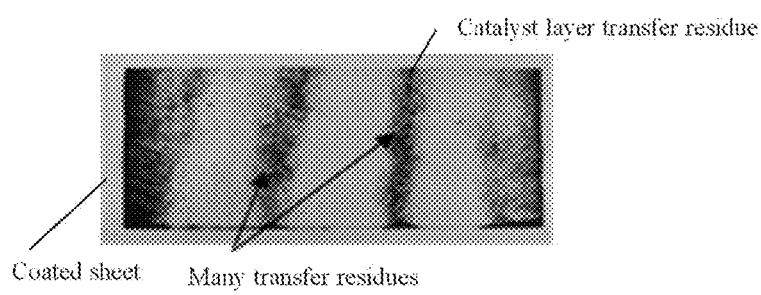
FIG. 2 is an electron microscope image showing an example of the substrate (a coated sheet) after the removal of the catalyst layer when the amount of the added cation additive is less than the amount specified in the present disclosure.

FIG. 2 is an electron microscope image showing an example of the substrate (a coated sheet) after the removal of the catalyst layer when the amount of the added cation additive is less than the amount specified in the present disclosure.

As shown in FIG. 2, when the addition amount of the cation additive is smaller than the specification of the present disclosure, a large amount of transfer residue of the catalyst layer is present on the substrate.

The cation additive interacts with the ionomer (dispersant) in the catalyst ink. Therefore, as shown in FIG. 1, the larger the addition amount of the cation additive is, the larger the particle size distribution of the carbon support becomes, and the dispersibility of the carbon support deteriorates.

Figure 3:
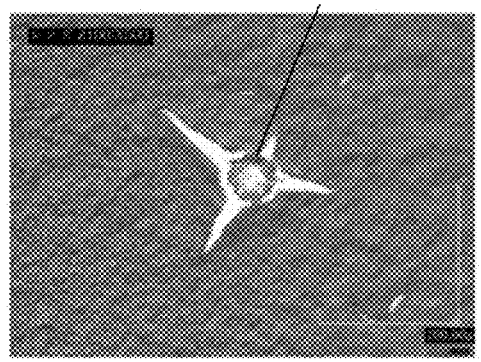
FIG. 3 shows an electron microscope image showing an example of the catalyst layer when the amount of the added cation additive is more than the amount specified in the present disclosure.

FIG. 3 shows an electron microscope image showing an example of the catalyst layer when the amount of the added cation additive is more than the amount specified in the present disclosure.

As shown in FIG. 3, when the addition amount of the cation additive is larger than the specification of the present disclosure, the dispersibility of the carbon support is deteriorated, and the quality of the catalyst layer caused by the carbon aggregate is deteriorated.

A method for producing a catalyst ink according to the present disclosure includes obtaining the catalyst ink.

The catalyst ink comprises a catalyst, a carbon support, an ionomer, a solvent, and a cation additive.

The catalyst ink may be obtained by dispersing a raw material mixture comprising a catalyst, a carbon support, an ionomer, a solvent, and a cation additive.

Examples of the catalyst include metals such as platinum, ruthenium, iridium, rhodium, palladium, osmium, tungsten, lead, iron, chromium, cobalt, nickel, manganese, vanadium, molybdenum, gallium, aluminum, lanthanum, cerium, praseodymium, neodymium, samarium, gadolinium, and yttrium, and two or more of these metals may be used. The metal may be an oxide, a nitride, a sulfide, a phosphide, or the like.

The catalyst may be platinum, a platinum alloy, or the like.

Metals other than platinum included in the platinum alloy include metals such as ruthenium, iridium, rhodium, palladium, osnium, tungsten, lead, iron, chromium, cobalt, nickel, manganese, vanadium, molybdenum, gallium, aluminum, lanthanum, cerium, praseodymium, neodymium, samarium, gadolinium, and yttrium, and may contain two or more of these metals. The catalyst may be platinum, a platinum-cobalt alloy, a platinum-nickel alloy, or the like.

The catalyst may be catalyst particles that are particulate in shape.

The particle size of the catalyst particles is not particularly limited, but may be 1 nm or more and 100 nm or less. The particle size of the catalyst particles can be measured by 3D-TEM or the like.

The catalyst is supported on a carbon support.

A method of supporting the catalyst on the carbon support is not particularly limited, and a conventionally known method can be appropriately employed.

The carbon support may be carbon support particles that are particulate in shape.

The carbon support may be a primary particle or a secondary particle.

The carbon support may be acetylene black, Ketjen black, channel black, roller black, disk black, oil furnace black, gas furnace black, lamp black, thermal black, activated carbon, graphite, glassy carbon, graphene, carbon fiber, carbon nanotube, carbon nitride, sulfurized carbon, and phosphated carbon, or a mixture containing at least two of these.

The solvent may be water, an organic solvent, a mixed solvent of water and an organic solvent, or the like.

Examples of the organic solvents include methanol, diacetone alcohol, ethanol, 1-propanol, 2-propanol, tert-butyl alcohol, ethylene glycol, and propylene glycol.

When a mixed solvent of water and an organic solvent is used, the content of the organic solvent in the mixed solvent can be arbitrarily selected depending on the purpose.

The ionomer may be, for example, a fluorine-based resin or a Nafion solution (manufactured by Du Pont Corporation). The amount of the ionomer to be added to the catalyst ink may be 1% by mass or more and less than 10% by mass.

The cation additive may be a material containing a metal that becomes a metal ion in the catalyst ink, or the like.

The metal ion may be a metal ion that is water-soluble, does not contaminate the catalyst layer and inhibit the function of the catalyst in the catalyst layer, and is capable of being present as a metal ion that does not precipitate as a metal and does not damage the electrolyte membrane even when exposed to an acidic environment having a pH of 0 to 5 and a low potential of about 0 to 1.0V during power generation.

Examples of the metal ions include ions such as sodium (Na), potassium (K), rubidium (Rb), magnesium (Mg), calcium (Ca), strontium (Sr), barium (Ba), cerium (Ce), and lanthanum (La). The metal ion may be a cerium ion.

[Production of Catalyst Ink]

The catalyst ink may be obtained by dispersing a raw material mixture comprising a catalyst, a carbon support, an ionomer, a solvent, and a cation additive. The method of dispersing the raw material mixture may be, for example, a method using a ball mill such as an ultrasonic homogenizer, a jet mill, or a bead mill, a high shear, a fill mix, or the like. The dispersion conditions such as the dispersion time are not particularly limited, and can be appropriately set.

The particle size D90 of the carbon support particles in the catalytic ink is less than 3 μm. The particle size D90 may be 2.5 μm or more. The particle size D90 of the carbon support particles in the catalyst ink is a definition of the dispersibility of the catalyst ink to ensure the qualities of the catalyst layers.

In the present disclosure, the particle size is a volume-based particle size value measured by laser diffraction/scattering particle size distribution measurement. In addition, in the present disclosure, the particle size D90 is a diameter in which the cumulative volume of the particles is 90% of the total volume when the particles are arranged in ascending order of the particle size.

When the catalyst ink is applied to a substrate to form a catalyst layer, the peel strength of the catalyst layer from the substrate is less than 3 N/m. The peel strength may be greater than or equal to 0.7 N/m. The peel strength is a specification for transferring the catalyst layer to the electrolyte membrane in good quality.

The weight per unit area of the cation additive in the catalytic ink applied to the substrate may be 2.0 µg/cm$^2$ or more, 2.1 µg/cm$^2$ or more, 3.3 µg/cm$^2$ or less, or 3.27 µg/cm$^2$ or less.

The amount of cation additive in the catalyst ink is alternatively defined by the weight per unit area of the cation additive in the catalyst ink applied to the substrate.

[Production of Catalyst Layer]

A method of manufacturing a catalyst layer according to the present disclosure includes applying the catalyst ink to the substrate to form the catalyst layer. After the catalyst ink is applied onto the substrate, the solvent in the catalyst ink may be removed. The solvent may be removed by warming the catalyst ink after coating on the substrate and drying the solvent.

Examples of the base material (coated sheet) include polytetrafluoroethylene (PTFE) and the like.

Examples of the coating method include a die coating method, a spin coating method, a screen printing method, a doctor blade method, a squeegee method, a spray coating method, and an applicator method. The heating rate and the heating time of the catalyst ink at the time of coating can be appropriately set depending on the solvent species and the like. Further, the removal rate of the solvent may be increased by degassing simultaneously with warming.

The coating thickness of the catalyst layer may be 5 to 30 µm.

The catalyst layer may be a cathode catalyst layer, an anode catalyst layer, or both a cathode catalyst layer and an anode catalyst layer.

The catalyst ink obtained by the production method of the present disclosure is used for a fuel cell, and specifically, is used for a catalyst layer of a fuel cell.

That is, the fuel cell of the present disclosure has a catalyst layer formed using the catalyst ink obtained by the manufacturing method of the present disclosure.

The fuel cell may have only one single cell, or may be a fuel cell stack in which a plurality of single cells are stacked.

In the present disclosure, both the single cell and the fuel cell stack may be referred to as a fuel cell.

The number of stacked single cells is not particularly limited, and may be, for example, 2 to several hundred.

The single cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes a cathode catalyst layer and a cathode-side gas diffusion layer.

The anode (fuel electrode) includes an anode catalyst layer and an anode-side gas diffusion layer.

The cathode catalyst layer and the anode catalyst layer are collectively referred to as a catalyst layer.

The cathode-side gas diffusion layer and the anode-side gas diffusion layer are collectively referred to as a gas diffusion layer.

The gas diffusion layer may be a conductive member or the like having gas permeability.

Examples of the conductive member include a carbon porous body such as carbon cloth and carbon paper, and a metal porous body such as a metal mesh and a metal foam.

The electrolyte membrane may be a solid polymer electrolyte membrane. Examples of the solid polymer electrolyte membrane include a fluorine-based electrolyte membrane such as a thin film of perfluorosulfonic acid containing moisture, and a hydrocarbon-based electrolyte membrane. The electrolyte membrane may be, for example, a Nafion membrane (manufactured by DuPont).

The single cell may include two separators that sandwich both surfaces of the membrane electrode gas diffusion layer assembly as needed. The two separators are one anode-side separator and the other cathode-side separator. In the present disclosure, the anode-side separator and the cathode-side separator are collectively referred to as a separator.

The separator may have holes constituting a manifold such as a supply hole and a discharge hole for allowing a fluid such as a reaction gas and a cooling medium to flow in the stacking direction of the single cells.

As the cooling medium, for example, a mixed solution of ethylene glycol and water can be used in order to prevent freezing at low temperatures. As the cooling medium, air for cooling can be used.

Examples of the supply hole include a fuel supply hole, an oxidant gas supply hole, and a cooling medium supply hole.

Examples of the discharge hole include a fuel discharge hole, an oxidant gas discharge hole, and a cooling medium discharge hole.

The separator may have a reaction gas flow path on a surface in contact with the gas diffusion layer. In addition, the separator may have a cooling medium flow path for keeping the temperature of the fuel cell constant on a surface opposite to the surface in contact with the gas diffusion layer.

The separator may be a gas impermeable conductive member or the like. The conductive member may be, for example, dense carbon obtained by compressing carbon to make it gas-impermeable, or a press-formed metal (for example, iron, aluminum, stainless steel, or the like) plate. In addition, the separator may have a current collecting function.

In the present disclosure, the fuel gas and the oxidizing gas are collectively referred to as a reaction gas. The reaction gas supplied to the anode is a fuel gas, and the reaction gas supplied to the cathode is an oxidant gas. The fuel gas is a gas mainly containing hydrogen, and may be hydrogen. The oxidizing gas is a gas containing oxygen, and may be air or the like.

The fuel cell stack may include a manifold such as an inlet manifold in which the supply holes are in communication with each other and an outlet manifold in which the discharge holes are in communication.

Inlet manifolds include fuel inlet manifolds, oxidant inlet manifolds, and coolant inlet manifolds.

Outlet manifolds include fuel outlet manifolds, oxidant outlet manifolds, and coolant outlet manifolds.

The fuel cell stack may be configured such that both ends thereof are sandwiched between a pair of end plates. As the end plate, for example, a metal such as stainless steel can be used. As the end plate, for example, an engineering plastic containing a thermosetting resin such as phenolic resin, epoxy glass, and polyester glass can be used.

The invention claimed is:

1. A method for producing a catalyst layer for fuel cells, wherein the method comprises obtaining a catalyst ink, and forming the catalyst layer by applying the catalyst ink to a substrate;
wherein the catalyst ink comprises a catalyst, a carbon support, an ionomer, a solvent and a cation additive;
wherein the catalyst is supported on the carbon support;
wherein the carbon support is carbon support particles;
wherein a particle size D90 of the carbon support particles in the catalyst ink is 2.8831 μm or more and 2.9913 μm or less;
wherein, a peel strength of the catalyst layer from the substrate is 0.7 N/m or more and 0.8 N/m or less; and
wherein a weight per unit area of the cation additive in the catalyst ink applied to the substrate, is 3 μg/cm$^2$ or more and 3.27 μg/cm$^2$ or less.

2. The method for producing the catalyst layer according to claim 1,
wherein the catalyst ink is obtained by dispersing a raw material mixture containing the catalyst, the carbon support, the ionomer, the solvent and the cation additive.

* * * * *